Patented Sept. 5, 1933

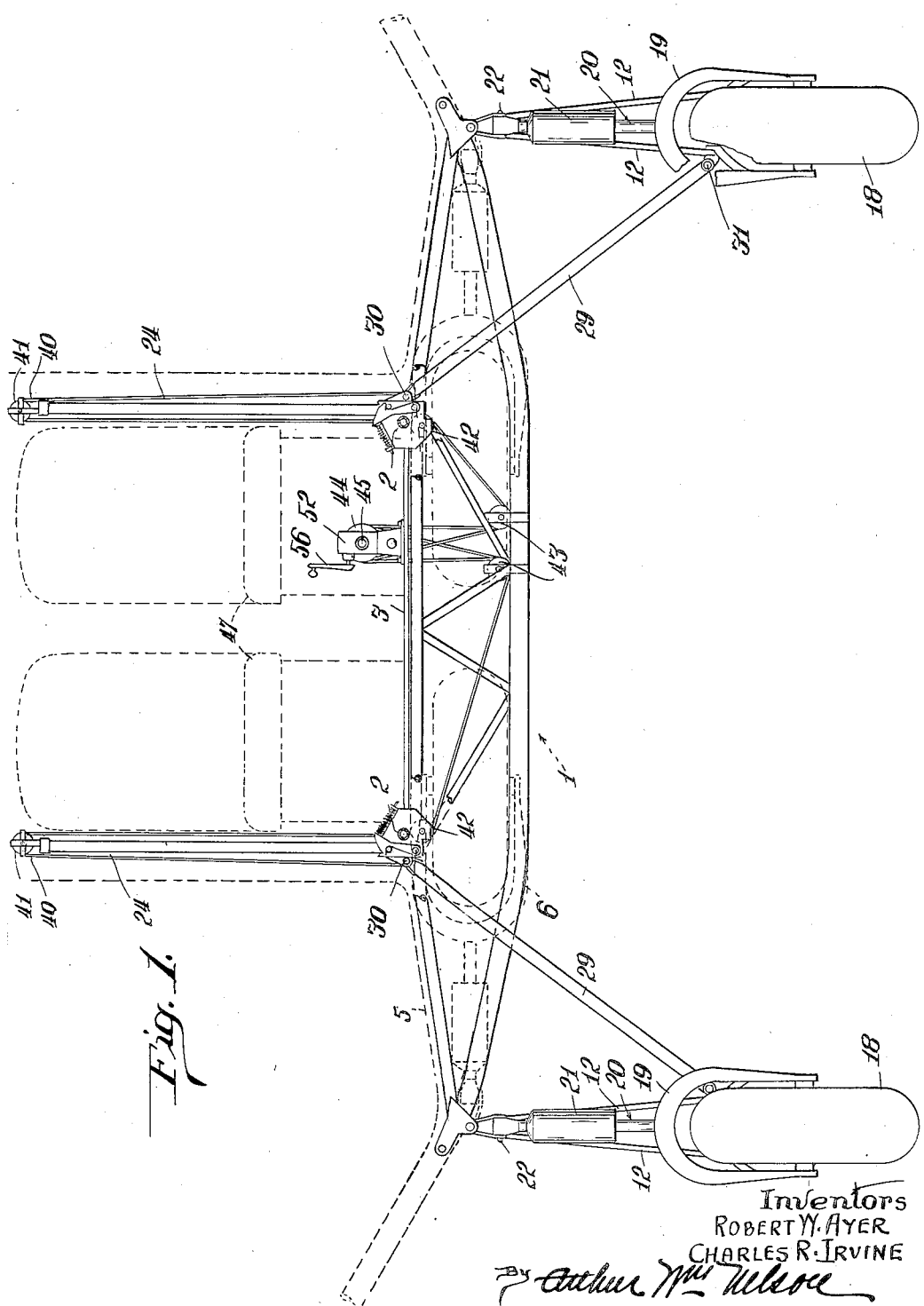

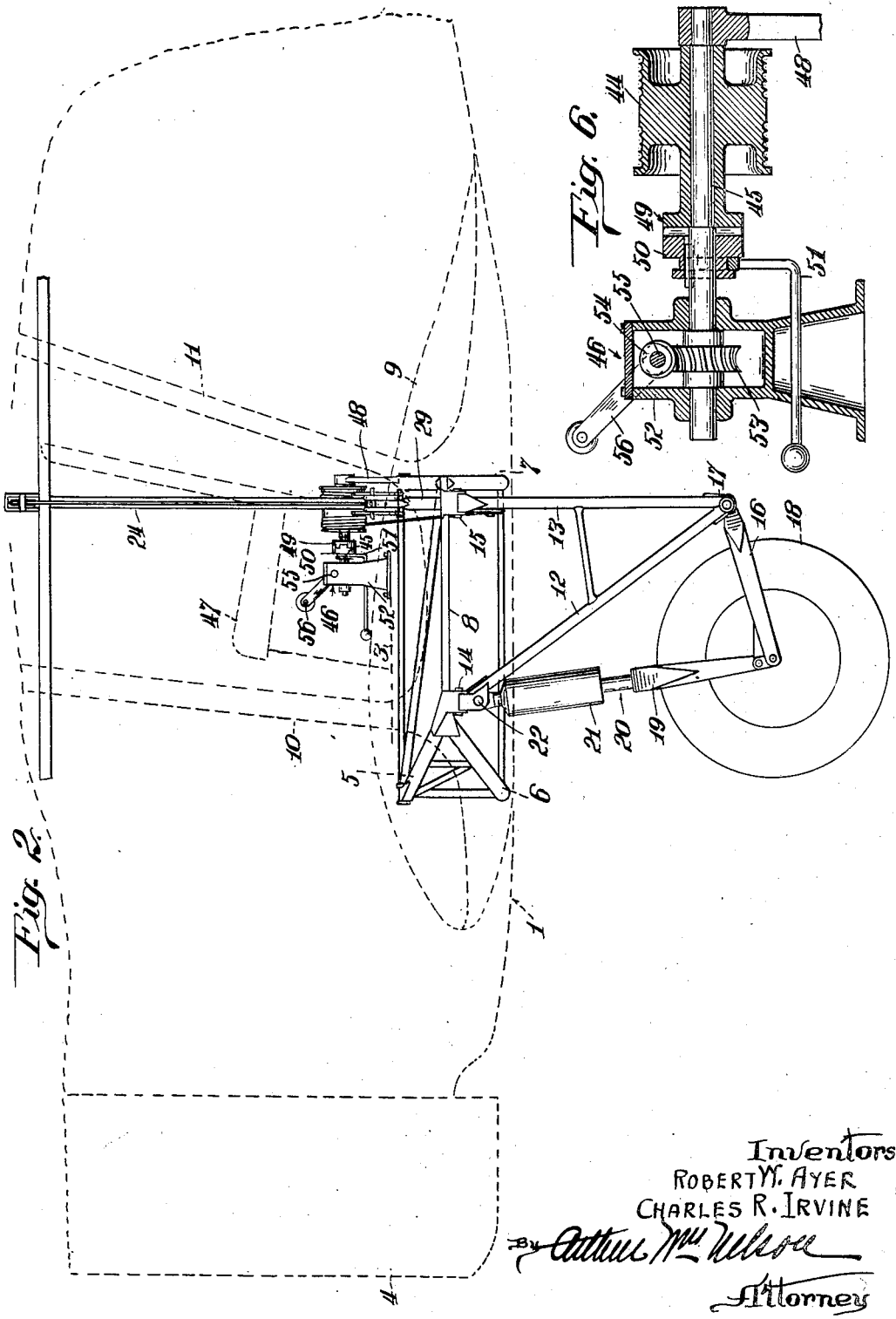

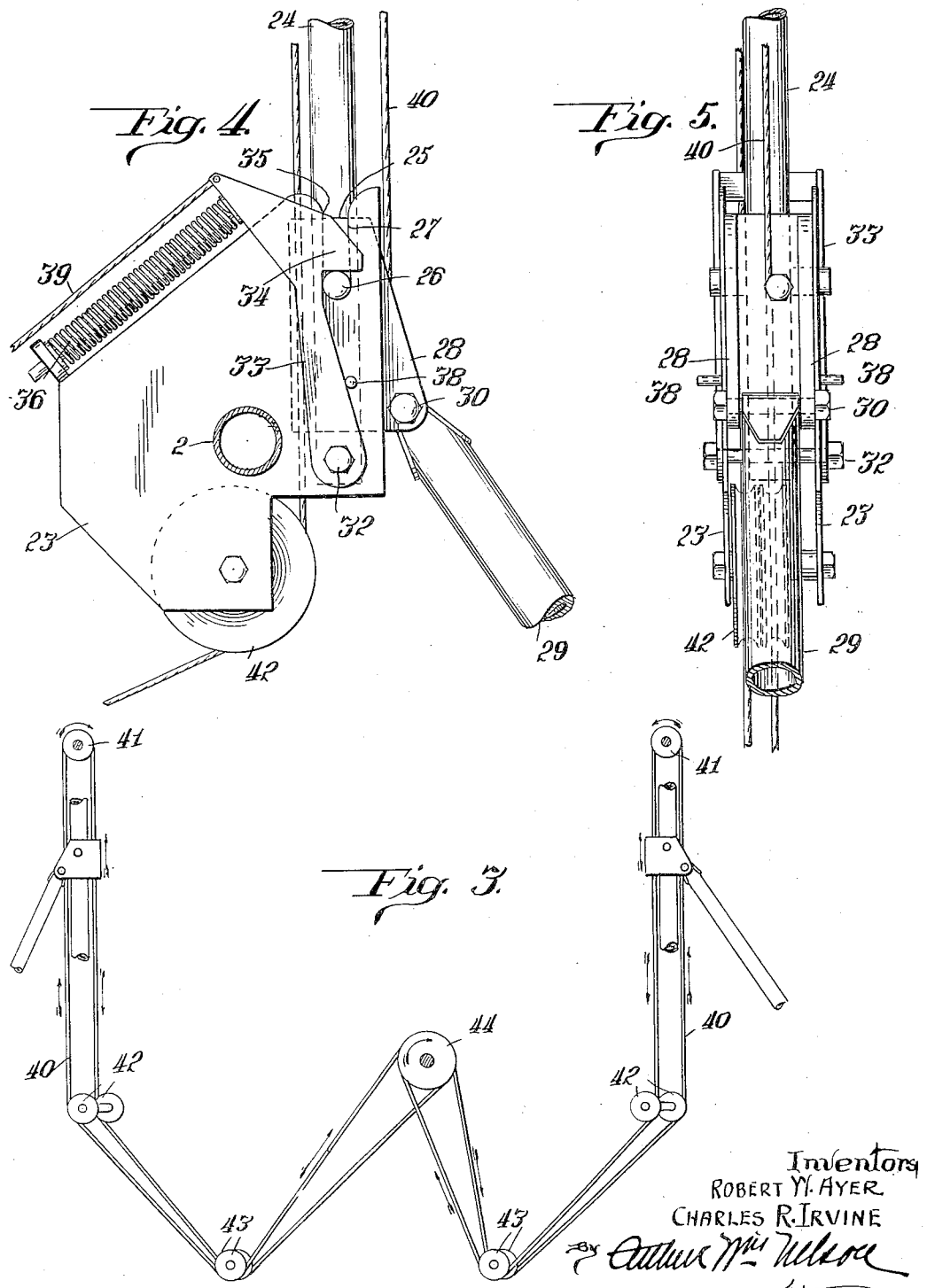

1,925,080

UNITED STATES PATENT OFFICE 1,925,080

RETRACTABLE LANDING GEAR

Robert W. Ayer and Charles R. Irvine, Wayne, Mich., assignors to Manning & Co., Chicago, Ill., a corporation of Illinois Application April 15, 1932. Serial No. 605,370

5 Claims. (Cl. 244—2)

This invention relates to improvements in retractable landing gears and it consists of the matters hereinafter described and more particularly pointed out in the appended claims.

The primary object of the invention is to provide an improved retractable landing gear for aircraft which is simple in construction and is fast and positive in operation.

Another object of the invention is to provide in a gear of this kind, means whereby the gear when released from its retracted position, is projected or swung by gravity into landing position and is positively and automatically locked in said position against any retractive movement due to landing impact.

Another object of the invention is to provide a gear of this kind wherein retracting movement is effected through cables and actuating means therefor and which cables support the gear in landing position, said actuating means being operable to release said cables therefrom so that said gear may instantaneously swing into a positively locked landing position.

Still a further object of the invention is to provide improved means for winding up the retracting cables and including actuating gearing and a drum, there being suitable devices incorporated in said means for disconnecting the drum from the gearing to permit instant projection of the gear from the retracted to the landing position.

Still a further object of the invention is to provide a gearing of this kind which includes as a part of the retracting mechanism, rigid strut members which in the projecting movement of the gear positively lock the gear in landing position against undesired movement under the action of landing impact.

The above mentioned objects of the invention, as well as others, together with the many advantages thereof, will more fully appear as we proceed with our specification.

In the drawings:—

Fig. 1 is a view in front elevation of a retractable landing gear for aircraft embodying the preferred form of our invention and which gear is shown in landing position.

Fig. 2 is a skeletonized view in side elevation of the gear with the parts in the position shown in Fig. 1.

Fig. 3 is a diagrammatic front view of the retracting cables for the gear, and which will be more fully referred to later.

Fig. 4 is a detail view in front elevation on an enlarged scale of means for automatically locking one end of one of the struts employed in the gear and which will be more fully referred to later.

Fig. 5 is a detail view in side elevation of the parts shown in Fig. 4.

Fig. 6 is a longitudinal vertical detail view on an enlarged scale, through means employed for actuating the retracting cables.

The improved gear contemplates the provision of an outrigger structure suitably secured to the fuselage shortly to the rear of the cowling and which outrigger tapers and extends laterally from each side of the fuselage and is operatively braced at its ends from the wings and is provided with a suitable fairing.

Pivotally connected to each end of the outrigger structure about an axis parallel with the median line of the fuselage is one end of a rigid frame structure, the other end of which is operatively engaged through a drag fork with a landing member which as shown herein is a landing wheel. The said wheel is further connected with the first mentioned end of the rigid structure by a telescopic and preferably hydraulic shock absorber.

Associated with and pivotally connected to each rigid frame structure is one end of a rigid strut, the other end of which is operatively connected to a runner or sleeve arranged for a sliding guided movement upon an upright post rising from the outrigger structure within the fuselage and preferably adjacent the pilot's seat. The runner or sleeve on each strut has secured thereto, both ends of suitable cables and both cables are wound or wrapped about a common actuating drum.

Said drum is loosely mounted upon a shaft which is rotated by means of suitable worm gearing and a manually operable clutch is disposed between said shaft and drum whereby said drum may be disconnected from said shaft for a free rotation independent of said gearing and shaft.

At the bottom of each post is means adapted for engagement by the associated sleeve for automatically locking the same against movement thereon.

When the gear is in landing position, the struts hold the same against undesired movement. To retract the gear, when the aircraft is in flight, said worm gearing is actuated to cause said sleeves to travel up the respective posts and this swings the rigid frame structure together with their landing wheels, up into a substantial horizontal position within the outrigger structure so that no part of said gear is exposed to set up a resistance to such flight.

When a landing is to be made, the clutch is actuated to release the drum from the gearing and then the rigid frame structures and landing members swing by gravity into a perpendicular landing position. In this movement of said frame structures toward landing position, the sleeves before mentioned as connected to the retracting struts, slide down the posts and automatically engage parts provided therefor to lock them against movement so that said struts hold the rigid frame structures and landing members against undesirable movement under landing impact.

In illustrating the invention, only those parts essential thereto are shown in connection with the immediately associated aircraft parts because as is apparent, the gear may be applied to different types of aircraft and such modifications of the gear as will make it applicable to said different types, will of course, be dependent upon the particular type of aircraft to which it is desired to apply such gear. Again the invention is illustrated as embodied in a gear adapted for a ground landing and therefore, the landing members are shown as wheels but as will be apparent, pontoons or floats may be substituted for wheels so that the aircraft can land upon or take off from a body of water.

Referring now in detail to that embodiment of the invention, illustrated in the accompanying drawings:—1 indicates as a whole the outline of an aircraft fuselage including the longérons 2, and 3 indicates the flooring of the aircraft which in this case may be a cabin plane. Shortly to the rear of the cowling 4 is provided an outrigger structure indicated as a whole at 5 in Fig. 1 and which structure includes, longitudinally spaced front and rear outriggers 6 and 7 respectively. Each outrigger comprises skeletonized frames of tubing which taper toward their ends and said ends are disposed a substantial distance outwardly beyond each side of the fuselage to be connected together by a spacing tube 8. The outrigger structure as a whole is provided with suitable fairing 9 and the ends thereof are connected to the wings (not shown) by the usual front and rear lift struts 10 and 11.

Associated with each outer end of the outrigger structure is V-shaped rigid frame structure including suitably braced pairs of laterally spaced front and rear legs 12 and 13 respectively which are pivoted at their top ends at 14 and 15 to the outrigger structure in a plane parallel to the longitudinal median plane of the fuselage. The bottom ends of each pair of said legs are suitably joined together and are pivotally connected to the rear end of a drag fork 16 as at 17. In the front end of said fork is mounted an associated landing member in the form of a wheel 18. Also pivotally connected to the front end of the drag fork is the bottom forked end 19 of a telescopic shock absorber 20, the top end of which is engaged in an absorbing cylinder 21. The top end of this cylinder is pivoted to and between the top end of the front legs 12 of the rigid frame structure before mentioned as shown at 22.

It is apparent that when the gear is in landing position, the landing impact of the wheel upon the ground is absorbed by the absorber 20.

Near each side of the fuselage at approximately the level of the floor 3 is a pair of upright front and rear brackets 23—23 suitably secured to an associated longéron 2. Disposed between the brackets of each pair is the bottom end of an upright post or tube 24 and said bottom end of the tube is held in place in any suitable manner. Slidable on each tube is a sleeve or runner 25 having laterally extending pins 26 thereon adapted to enter the open top ends of upright slots 27 in the top ends of each pair of brackets 23. Each sleeve includes a pair of spaced ears 28 between which is engaged the top end of a retracting strut 29 which in turn is pivotally connected thereto as at 30. The bottom end of each retracting strut is pivotally connected as at 31 to the bottom end of the inner legs 12 of an associated rigid frame structure before mentioned.

Pivotally mounted on the brackets 23 of each pair of brackets as at 32 is a latch 33 having a top end head 34 and the top edge 35 of this head is inclined or angled off as best shown in Fig. 4. A spring 36 carried by the brackets 23 so engages the heads of both latches 33 that the inclined edges thereof stand across the slots 27 in said brackets and said latches are limited in movement in this direction by means of stop pins 38. A trip cord 39 is connected to the head of each pair of latches and this cord extends into a position convenient for the pilot or operator.

The sleeve or runner 25 on each post 24 has connected thereto the ends of an associated flexible member in the form of a cable 40. A part of each cable passes over a pulley 41 on the top end of an associated post 24 and both laps of said cable then pass over pairs of pulleys 42—43 respectively, and a mid portion of each cable passes several turns around a drum 44. In Fig. 3 which shows the cable arrangement described, the pulleys of each pair of pulleys 42—43 are shown offset, merely to better disclose them but in reality the pulleys of each pair are mounted on the same axis.

The drum 44 is loose on a part of a shaft 45 of a suitable actuating means 46 disposed beneath one of the pilot seats 47 shown in dotted lines in Figs. 1 and 2. The rear end of said shaft is journalled in an upright bracket 48 rising from the rear outrigger 7. On the mid portion of the shaft 45 is a clutch member 49 adapted for engagement with and disengagement from an associated clutch member 50 fixed to the front end of the drum 44, the clutch member 50 being shiftable toward and away from the clutch member 49 by means of a lever 51.

The front part of the shaft 45 is journalled in an upright casing 52 fixed to and upstanding upon the floor 3 and in said casing there is fixed to said shaft part a worm gear 53 with which meshes a worm 54 secured to a transverse shaft 55, journalled in said casing. Fixed to said transverse shaft outside the casing is a handle 56 by means of which the pilot while occupying his seat, may operate said means 46.

Assume that the gear is in the landing position, shown in full lines in Fig. 1. Further, assume that the aircraft has taken off in flight and it is desired to retract the gear up into the outrigger to reduce flight resistance. Under such conditions, and assuming the clutch members 49 and 50 are engaged, the cords 39 are first actuated to release the latches 33 and then the pilot reaches under the seat and turns the handle 56. This through the worm 54 and gear 53 will rotate the shaft 45 and will of course, impart rotation to the drum 44. This will cause a part of each cable to wind up on the drum and will cause another part of each cable to pay off from said drum.

As both ends of each cable are connected to an associated sleeve or runner 25 both sleeves are caused to move upwardly upon the associated posts 24. This carries those associated ends of each strut 29 upwardly on said posts and gradually swings the rigid frame structures and landing wheels upwardly and inwardly into a horizontal position within the outrigger as shown in dotted lines in Fig. 1. Due to the use of the worm gearing in said means 46 it is apparent that the cables are locked against reverse movement and thus support the weight of the landing gear when in retracted position.

When it is desired to make a landing, the lever 51 is actuated to release the clutch member 50 from the clutch member 49 and this disconnects the drum from the shaft 45. As the holding action of the worm gearing has been removed from the cables, the drum runs free and each rigid frame structure with its wheel swings outwardly and downwardly under the action of gravity, into landing position. This swinging movement of the rigid structures and wheels, of course, imparts movement to its associated strut so that the sleeves 25 slide down their respective posts. As each sleeve approaches its associated pair of brackets 23, the pins 26 on said sleeves enter the top ends of the slots 27 in said brackets and engage the inclined top end edges of the latch heads 34 and push them laterally inward against the action of the springs 36 so that said pins clear said head. When said pins have so cleared said heads, said latches snap back and lock said pins in place.

Upon impact of the landing wheels upon the ground as when making a landing, the rigid frame structures carrying said wheels are held against folding inward and the aircraft then taxies to a stop upon said wheels.

It is apparent from the foregoing that the landing gear may be readily and almost instantaneously projected into landing position and is locked in this position so soon as the same is reached. When in a retracted position, said gear is disposed entirely within the outrigger and flight resistance so far as the gear is concerned, is reduced to a minimum.

While in describing the invention, we have referred in detail to the form, arrangement and construction of the parts thereof, the same is to be considered as illustrative of one embodiment thereof, so that we do not wish to be limited thereto except as may be specifically set forth in the appended claims.

We claim as our invention:—

1. In a landing gear, an outrigger, a rigid V-shaped structure, pivotally connected at its top end to longitudinally spaced points on said outrigger, a shock absorber pivotally connected at one end coincident with one of the pivotal connections for said V-shaped structure, a landing member pivotally connected to the other end of said shock absorber, means connecting the other end and apex end of said V-shaped structure to said landing member and means operatively engaged with said V-shaped structure for swinging the landing gear as a unit up into said outrigger.

2. In a landing gear, an outrigger, a rigid V-shaped structure, pivotally connected at its top end to longitudinally spaced points on said outrigger, a shock absorber pivotally connected at one end coincident with one of the pivotal connections for said V-shaped structure, and including a fork at its other end, a landing wheel operatively engaged in the fork end of said shock absorber, a drag fork operatively connecting said wheel with the other end and apex end of said V-shaped structure and means operatively engaged with said V-shaped structure for swinging the landing gear as a unit up into said outrigger.

3. In a landing gear, an outrigger including front and rear outrigger members, a V-shaped member having ends pivotally connected to said front and rear outrigger members respectively, a shock absorber including relatively telescopic top and bottom parts, means pivotally connecting the top end of said shock absorber top part to one of the ends of said V-shaped member in a plane at a right angle to that of the pivotal connection between said V-shaped member and outrigger members, a landing wheel operatively engaged in said fork, a drag fork having pivotal connections with said wheel and with the other and apex end of said V-shaped member and which connections are parallel with that one between said top part of the shock absorber and its associated end of said V-shaped member and means connected to said V-shaped member for swinging the gear as a whole up into the space between said front and rear outrigger members.

4. In combination with an aircraft including a fuselage, landing gear therefor comprising a substantially V-shaped structure arranged at each side of the fuselage and each pivotally connected at the top end to the fuselage for a swinging movement about an axis longitudinally of the fuselage, a shock absorbing device operatively connected at one end to the top end of each V-shaped structure, means connecting the bottom end of each V-shaped structure to the other end of an associated shock absorbing device, a landing member operatively connected to each last mentioned means and means for swinging the gear from a landing to a retracted position and vice versa.

5. In combination with an aircraft including a fuselage, landing gear therefor comprising a substantially V-shaped structure arranged at each side of the fuselage and each pivotally connected at the top end to the fuselage for a swinging movement about an axis longitudinally of the fuselage, a shock absorbing device operatively connected at one end to the top end of each V-shaped structure, a drag fork operatively connecting the bottom end of each V-shaped structure to the other end of an associated shock absorbing device, a landing wheel operatively mounted in each drag fork and means for swinging the gear from a landing to a retracted position and vice versa.

ROBERT W. AYER.
CHAS. R. IRVINE.